3,404,006
WINE PREPARATION BY FERMENTING A JUICE, CONCENTRATING THE FERMENTED PRODUCT, AND OPTIONALLY FORTIFYING THE CONCENTRATE
Emil A. Malick, Bartlesville, Okla., assignor to Phillips Petroleum Company, a corporation of Delaware
No Drawing. Filed Aug. 31, 1964, Ser. No. 393,424
2 Claims. (Cl. 99—35)

ABSTRACT OF THE DISCLOSURE

A sugar-containing juice is fermented and the fermented and the fermented product concentrated by fractional crystallization to give a concentrate having a high alcohol content and a favorable balance of alcohol and flavor bodies. The concentrate can be fortified if desired by the addition of alcohol.

---

This invention relates to a method of preparing wine and the products therefrom.

The term "wine" is generally considered to cover the fermented juice of fruits and the alcoholic fermented juice of plant materials containing sugars. Generally, dessert or fortified wines have an alcohol content of 17 to 24 percent by volume; however, the fruits from which such wines are made will generally produce a maximum, upon fermentation, of 10 to 12 volume percent alcohol. Thus, heretofore to produce such wines fortification was required to meet the necessary 17 and above volume percent alcohol content through the addition of distilled spirits, other sources of alcohol, and sugar. However, in dessert wines, fuller-bodied fruit flavor and sweetness are highly desirable and the fortification step as now practiced introduces an amount of alcohol which is highly disproportionate to the amount of wine flavor and body components present and therefore produces a product having an unnatural or artificial balance.

It has been found that a sweet yet full-bodied dessert wine can be produced, which has a favorable proportion of wine flavor bodies to alcohol and which is not attainable by the conventional methods discussed above since those methods yield a relatively lower proportion of body and flavor components to alcohol, by concentrating a suitable wine by fractional crystallization. By the fractional crystallization process of this invention there is produced a significant increase, e.g., about 100 percent, in the concentration of flavor and aromatic components prior to fortification of the wine and thereby provides the favorable proportion of wine flavor bodies to alcohol.

Accordingly, it is an object of this invention to provide an improved method of making wines and especially those wines requiring a high alcohol content. Another object of this invention is to produce an improved wine, especially in the class of dessert or fortified wines. It is another object of this invention to provide a method for more rapidly aging the wines produced.

Other aspects, objects and the several advantages of the invention will be readily apparent to those skilled in the art from the following disclosure and the appended claims.

According to this invention a sugar-containing juice is fermented either to the fullest extent possible or to a lesser extent to produce a dilute wine product. The thus partially or totally fermented wine is concentrated by a fractional crystallization process to yield a concentrate having an alcohol and flavor body content greater than that of the fermented product without the use of additional alcohol from external sources. The concentrate is then fortified, e.g., by the addition of alcohol, to produce the desired wine as a product of the process.

Also, according to this invention it has been found that a wine which has been treated by the fractional crystallization process of this invention is, to a significant degree, aged and therefore the need for aging by storing for extended periods of time is either eliminated or significantly reduced.

More specifically, according to this invention, a sugar-containing juice can be fermented to any desired degree, generally from about 7 volume percent alcohol to about 12 or more volume percent alcohol if possible. The method of concentrating the wine according to this invention makes use of crystal purification columns such as are described in U.S. Patent Re. 23,810 to Schmidt, and U.S. Patent 2,854,494 to R. W. Thomas. The use of these crystal purification columns involves the formation of a crystal slurry by cooling the product to be concentrated and then forcing the resulting slurry of crystals and mother liquor into an elongated confined separation zone. The crystals are moved in a compact mass into a body of liquid which is formed by melting the crystals in a downstream portion of the concentration zone. A portion of the crystal melt is displayed back into the advancing crystal mass to remove occluded mother liquor therefrom. Crystals enter the column at a temperature below the melting point of pure water so that they are warmed and ultimately melted as they are passed through the separation zone. Concentrate is removed from an area removed from the downstream or melting portion of said concentration zone. Relatively pure water is removed from the downstream end of said concentration zone. The crystallization process above described has many advantages over other known concentrating methods, which advantages appear to account for the superior properties of the product of this invention. One of these advantages is that the process is under positive pressure and is liquid full at all times and, for this reason, there are no interfaces of liquid and gas phases present. This means that there are no regions in the separation step where high relative velocities exist between liquid and gas phases, which might cause either vaporization (due to low pressures at the interface at high relative velocities) or shear and pickup of sheared liquid by the gas phase, all of which is of particular significance in the case of wine since retention of flavor components, particularly volatile ones, is of great importance. Another advantage is that there are no moving parts in the separation column and, for this reason, there are no points where seals in contact with moving parts might cause wear, contamination due to such wear, or trapping of wine components which, once trapped, could undergo change and cause flavor or other quality degradation. Also, in this respect no foreign materials of any type, e.g., chemicals, solvents, lubricants, are present. Another advantage is that the need for separate mechanical means for removing trapped or occluded wine product from ice crystal formed is completely eliminated. The reason for this is that the water is separated as water and not as ice crystals, and because this takes place during and as a part of the basic separation itself. The elimination of ice crystals in turn eliminates the need for washing of ice crystals, such as may be required by other processes in order to recover more of the occluded wine product. In addition to eliminating the operation itself, this in turn eliminates any dilution of the wine concentrate with such washings. Numerous other technical and economical advantages are realized by the practice of this invention, not the least of which is that there are no ice crystals to handle and therefore no need for special equipment for conveying, melting or otherwise disposing of ice. Also, the water removed is of excellent quality and can be reused. Also, high concentrations are achieved at very low loss of wine and products of varying concentration at varying rates of throughput can be made with the same concentrating units.

The crystallization concentration process will about double the flavor body and alcohol content of the fermented product, i.e., for the alcohol, from 7 to 12 percent to 14 to 20 percent by volume. The increase in flavor body and alcohol content will generally be in the range of from about 1.5 to about 2.5 times that amount which is present in the fermented juice. The concentrate can then be utilized to form, by reconstituting, a wine having an alcohol content substantially equal to or less than that of the concentrate. The concentrate can then be fortified, as discussed above, to produce a dessert wine which can have an alcohol content of from about 17 volume percent to 24 volume percent. Fortification can be achieved with any material capable of providing an increased alcohol content without having a derogatory effect upon the taste and other required and desirable properties of the wine. Thus, it can be seen that it is within the scope of this invention to avoid a harsh flavor caused by excessive acidity, tartness, and aftertaste without sacrificing a high alcohol content by a proper combination of fermentation, concentration, and fortification steps, each step carried to a varying degree depending upon the type of raw material used, i.e., grape, orange, peach, etc., and the desired taste and alcohol content of the ultimate product of the invention.

Finally, by employing the fractional crystallization process above discussed, aging of the wine produced by this invention is accelerated to a significant extent. The primary effect of the aging process is the clarifying of the wine by the agglomeration and precipitation of various undesirable materials. The particles which are removed during the aging process are quite small, and rather than each individual particle precipitating by itself it is necessary that the particles contact one another and agglomerate to form a larger particle agglomerate which is not affected by Brownian movements, convention, and other mechanisms which tend to keep the individual particles from settling out. Thus, aging not only is a time-dependent function but also is dependent upon the spacing of the particles in the wine which must agglomerate. Thus, it can be seen that a very important factor in the aging process is the relative spacing of the particles.

By the fractional crystallization process of this invention a large amount of water is removed from the dilute wine and the concentrate formed has a greatly reduced volume. This volume reduction reduces the distance between the particles which must contact and agglomerate to settle out during aging. Therefore, the probability of collision and agglomeration of these particles is increased exponentially due to the reduction in volume. For this reason the wine concentrate of this invention requires a significantly decreased time for aging. It should also be noted that by use of the fractional crystallization process not only is aging accelerated due to increased concentration and therefore accelerated precipitation but also, and concurrent therewith, a positive pressure is maintained on the wine which will keep volatile flavor bodies in the concentrate. This positive pressure helps to provide a fuller-bodied wine by retaining body and flavor components which, when the wine is ultimately fortified, will help produce a favorable balance of flavor bodies to alcohol.

EXAMPLE I

Grapes are harvested at a Balling of 24° (measure of sugar content) or over and crushed and stemmed. In order to secure a good extraction of color from the skin the juice and skins are heated very rapidly to about 200° F., held for 1 to 2 minutes at this temperature, and then cooled. The cooled material is then pressed for separation of juice. The juice termed a "must" is then fermented at 45° F. for about 10 days to produce a fermented product containing about 8 volume percent alcohol. The fermented concentrate is cooled to a temperature of 25° F., thereby forming a slurry of ice crystals in mother liquor, the slurry having a solids content of 50 weight percent. The slurry is passed through a crystal separation column wherein the ice crystals are melted and the resulting melt is withdrawn as purified water. Based upon 100 pounds of wine fed to the chiller, 50 pounds of water and 50 pounds of wine concentrate are withdrawn from the separation column. The pressure throughout the crystallizer is about 100 p.s.i.g. The mother liquor, i.e., wine concentrate, is filtered and has an alcohol content of about 16 volume percent. The concentrate has an amount of ethanol added thereto sufficient to raise the alcohol content of the combined materials to 21 volume percent. The 21 volume percent wine is the product of the invention and exhibits properties of a fuller-bodied, aged wine.

EXAMPLE II

The same process is followed as that set forth in Example I; however, the fermented wine is fortified with ethanol from its initial 8 volume percent alcohol content to the final 21 volume percent alcohol content without the crystallization concentration operation.

The wine produced by fortifying the fermented wine in this fashion has an acid and tart taste and leaves an undesirable aftertaste. The product of Example I has an excellent taste which is not acidic or tart and leaves a much more pleasant aftertaste, thereby indicating a better balance and a more favorable proportion of flavor bodies and alcohol which was not attained by the conventional means of Example II. Rather, Example II lowered the proportion of flavor bodies relative to the alcohol content since all that was added was pure alcohol, thereby yielding a wine which contained a disproportionate amount of alcohol to the amount of flavor bodies present.

It should be noted that fortification is not necessary unless a higher alcohol content is required and that the concentrate above discussed can be utilized to produce wines of a lesser alcohol content.

It should also be noted that this invention applies to any type of wine including grape, orange, peach, cherry, blackberry, loganberry, currant, apple, strawberry, and other sugar-bearing fruits. Also, this invention applies to wines produced from various herbs and vegetables, e.g., dandelion, bean, rhubarb, rose and the like, by artificial means such as adding sugar.

Reasonable variations and modifications of this invention can be made, or followed, in view of the foregoing, without departing from the spirit or scope thereof.

I claim:

1. A method of making wine comprising fermenting a sugar-containing juice to an alcohol content of from about 7 to about 12 volume percent, concentrating the fermented juice before any fortification by fractional crystallization to produce a concentrate containing a flavor body and an alcohol content greater than that initially present in the fermented juice, said alcohol content being from about 14 to about 20 volume percent, and fortifying said concentrate to produce a dessert wine having an alcohol content of from 17 to about 24 volume percent.

2. A method of making wine comprising fermenting a sugar-containing juice to an alcohol content from about 7 to about 12 volume percent, increasing the flavor body and alcohol content of the fermented juice by concentrating said juice before fortification by cooling same to form a water crystal-wine mother liquor slurry, forcing said slurry into an elongated and confined separation zone, moving said crystals into a compact mass, advancing said compact mass into a body of liquid which is formed by melting the water crystals in a downstream portion of said sepaartion zone, displacing a portion of said liquid back into said advancing crystal mass to remove occluded wine mother liquor therefrom, separating from an upstream portion of said separation zone concentrated wine mothed liquor having an alcohol of from about 14 to about 20 volume percent, and fortifying said mother liquor with alcohol to produce a dessert wine having an alcohol content of from 17 to about 24 volume percent.

References Cited

UNITED STATES PATENTS 761,387  5/1904  Monti ---------------- 99—35
2,854,494  9/1958  Thomas ----------- 99—205 X

OTHER REFERENCES

Brown, et al., Vinification in California Wineries. Ind. & Eng. Chem. vol. 27, No. 11, November 1935 (pp. 1237 and 1238).

Von Loesecke et al., Wines, Brandies and Cordials from Citrus Fruits. Ind. & Eng. Chem., vol. 28, No. 10, October 1936 (pp. 1227 and 1228).

ALVIN E. TANENHOLTZ, *Primary Examiner.*

D. M. NAFF, *Assistant Examiner.*